US006865738B2

(12) United States Patent
Mathiske et al.

(10) Patent No.: US 6,865,738 B2
(45) Date of Patent: Mar. 8, 2005

(54) METHOD AND APPARATUS FOR MANAGING INDEPENDENT ASYNCHRONOUS I/O OPERATIONS WITHIN A VIRTUAL MACHINE

(75) Inventors: Bernd J.W. Mathiske, Cupertino, CA (US); Saul G. Wold, Eugene, OR (US); Ioi K. Lam, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 218 days.

(21) Appl. No.: 10/267,382

(22) Filed: Oct. 8, 2002

(65) Prior Publication Data

US 2004/0068725 A1 Apr. 8, 2004

(51) Int. Cl.[7] .............................. G06F 9/455; G06F 9/46
(52) U.S. Cl. .......................................... 718/1; 718/100
(58) Field of Search .............................. 718/1, 100–108

(56) References Cited

U.S. PATENT DOCUMENTS 6,085,303 A * 7/2000 Thorson et al. ............... 712/16
6,256,637 B1 * 7/2001 Venkatesh et al. ......... 707/103 Y

* cited by examiner

Primary Examiner—Meng-Al T. An
Assistant Examiner—Kenneth Tang
(74) Attorney, Agent, or Firm—Park, Vaughan & Fleming, LLP

(57) ABSTRACT

One embodiment of the present invention provides a system that facilitates performing independent asynchronous I/O operations within a platform-independent virtual machine. Upon encountering an I/O operation, a language thread within the system marshals parameters for the I/O operation into a parameter space located outside of an object heap of the platform-independent virtual machine. Next, the language thread causes an associated operating system thread (OS-thread) to perform the I/O operation, wherein the OS-thread accesses the parameters from the parameter space. In this way, the OS-thread does not access the parameters in the object heap directly while performing the I/O operation.

19 Claims, 3 Drawing Sheets

METHOD AND APPARATUS FOR MANAGING INDEPENDENT ASYNCHRONOUS I/O OPERATIONS WITHIN A VIRTUAL MACHINE

BACKGROUND

1. Field of the Invention

The present invention relates to techniques for managing Input/Output (I/O) operations within a computer system. More specifically, the present invention relates to a method and an apparatus for performing independent asynchronous I/O operations within a platform-independent virtual machine within a computer system.

2. Related Art

The exponential growth of the Internet has in part been fueled by the development of computer languages, such as the JAVA™ programming language distributed by Sun Microsystems, Inc. of Santa Clara, Calif. The JAVA programming language allows an application to be compiled into a module containing platform-independent byte codes, which can be distributed across a network of many different computer systems. Any computer system possessing a corresponding platform-independent virtual machine, such as the JAVA virtual machine, is then able to execute the byte codes. In this way, a single form of an application can be easily distributed to and executed by a large number of different computing platforms.

These platform-independent virtual machines are presently being incorporated into smaller pocket-sized computing devices, such as personal organizers. Unfortunately, memory space is severely constrained within these pocket-sized computing devices. Hence, system designers must use as little memory space as possible in implementing virtual machines within these pocket-sized computing devices.

Platform independent virtual machines typically provide run-time support for multiple "language threads" (L-threads). For example the JAVA virtual machine supports the execution of multiple JAVA threads. In larger computer systems it is practical to implement L-threads using a one-to-one mapping with underlying operating system threads (OS-threads). However, memory-constrained computing devices often lack the virtual memory capabilities to make this possible. Furthermore, a one-to-one mapping requires a large number of OS-threads, which can consume a large amount of memory space.

For this reason, in memory-constrained systems L-threads are often implemented as co-routines that share a single OS-thread. Unfortunately, if multiple L-threads share a single OS-thread, implementing I/O operations can be a problem because an I/O operation can potentially cause the single OS-thread to block, even if other L-threads are waiting to perform useful work. To remedy this problem, some systems pair an L-thread with an extra OS-thread during the time the L-thread is performing an I/O operation. In way, the extra OS-thread can perform the I/O operation on behalf of the L-thread, and the L-thread is de-scheduled until the OS-thread completes the I/O operation. After the I/O operation completes, the OS-thread is returned to the shared pool, which allows the OS-thread to be reused.

In order to perform the I/O operation, the OS-thread typically manipulates parameters for the I/O operation located in an object heap within the virtual machine. This creates problems because the object heap is typically subject to periodic garbage collection operations, which can potentially move the parameters within the object heap. Hence, the OS-thread must acquire a garbage collection (GC) lock while accessing the object heap to ensure that garbage collection operations do not cause the OS-thread to access the wrong locations in the object heap. Moreover, allowing the OS-thread to access the object heap generally reduces system reliability because the OS-thread can potentially corrupt the object heap.

Hence, what is needed is a method and an apparatus for performing I/O operations within a platform-independent virtual machine without the problems listed above.

SUMMARY

One embodiment of the present invention provides a system that facilitates performing independent asynchronous I/O operations within a platform-independent virtual machine. Upon encountering an I/O operation, a language thread within the system marshals parameters for the I/O operation into a parameter space located outside of an object heap of the platform-independent virtual machine. Next, the language thread causes an associated operating system thread (OS-thread) to perform the I/O operation, wherein the OS-thread accesses the parameters from the parameter space. In this way, the OS-thread does not access the parameters in the object heap directly while performing the I/O operation.

In a variation on this embodiment, after the OS-thread finishes the I/O operation, the language thread unmarshals parameters from the parameter space and then returns from the I/O operation.

In a variation on this embodiment, marshalling the parameters involves marshalling the parameters from the object heap, and unmarshalling the parameters involves unmarshalling the parameters into the object heap.

In a variation on this embodiment, the platform-independent virtual machine operates in accordance with a hybrid thread model in which language threads that are not performing I/O operations execute as co-routines on a single OS-thread, and wherein language threads performing I/O operations are associated with dedicated OS-threads that perform the I/O operations.

In a variation on this embodiment, the parameter space is associated with the OS-thread and is allocated from a global pool of memory located outside of the object heap.

In a variation on this embodiment, the parameter space is associated with the OS-thread and is allocated in an unused end of the object heap.

In a variation on this embodiment, the parameter space is allocated in stack space associated with the OS-thread.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computing Device

Figure 1:
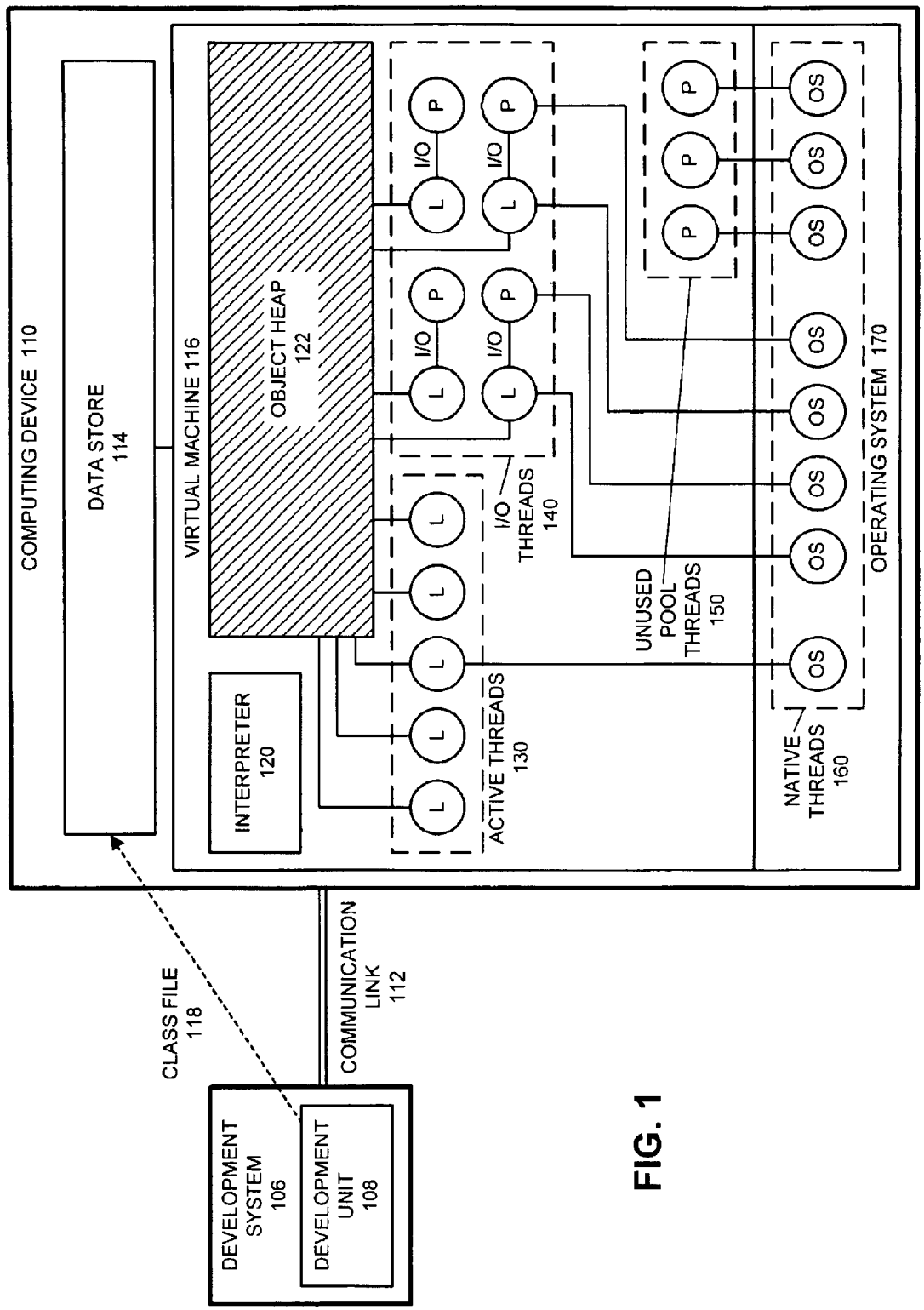
FIG. 1 illustrates a computing device in accordance with an embodiment of the present invention.

FIG. 1 illustrates a computing device 110 coupled to a development system 106 in accordance with an embodiment of the present invention. Development system 106 can generally include any type of computer system, including, but not limited to, a computer system based on a microprocessor, a mainframe computer, a digital signal processor, a portable computing device, a personal organizer, a device controller, and a computational engine within an appliance. Development system 106 contains development unit 108, which includes programming tools for developing platform-independent applications.

Development system 106 is coupled to computing device 110 through a communication link 112. Computing device 110 can include any type of computing device or system including, but not limited to, a mainframe computer system, a server computer system, a personal computer, a workstation, a laptop computer system, a pocket-sized computer system, a personal organizer and a device controller. Computing device 110 can also include a computing device that is embedded within another device, such as a pager, a cellular telephone, a television, an automobile, or an appliance.

Communication link 112 can include any type of permanent or temporary communication channel that may be used to transfer data from development system 106 to computing device 110. This can include, but is not limited to, a computer network such as an Ethernet, a wireless communication network or a telephone line.

Computing device 110 includes data store 114, for storing code and data, as well as a virtual machine 116 for processing platform-independent programs retrieved from data store 114.

During the development process, a class file 118 is created within development unit 108. Class file 118 contains components of a platform-independent program to be executed in computing device 110. For example, class file 118 may include methods and fields associated with an object-oriented class. Next, class file 118 is transferred from development unit 108 through communication link 112, into data store 114 within computing device 110. This allows virtual machine 116 to execute an application that accesses components within class file 118. Note that virtual machine 116 can generally include any type of virtual machine that is capable of executing platform-independent code, such as the JAVA VIRTUAL MACHINE™ developed by SUN Microsystems, Inc. of Palo Alto Calif.

Virtual machine 116 is implemented on top of an underlying operating system 170. More specifically, virtual machine 116 is implemented using a number of native OS-threads 160 within operating system 170, which are represented by the letters "OS". Note that operating system 170 can generally include any type of operating system for a computing device that supports multiple native OS-threads.

Virtual machine 116 includes an interpreter 120, which interprets platform-independent code from data store 114 during program execution. Virtual machine 116 can alternatively execute compiled code. This compiled code is produced by compiling platform-independent code into native code for computing device 110.

Virtual machine 116 also includes object heap 122 for storing objects that are manipulated by code executing on virtual machine 116.

Virtual machine 116 also supports multiple language threads (L-threads), which are represented by the letter "L", as well as multiple pool threads, which are represented by the letter "P". These pool threads can be implemented as objects that provide handles for interacting with associated native OS-threads (represented by the letters "OS") within operating system 170. (In FIG. 1, pool threads are connected by solid lines to their associated native threads.)

As is illustrated in FIG. 1, some of the L-threads are active L-threads 130, which execute as co-routines on a single OS-thread 161. Other L-threads are I/O threads 140, which are associated with on-going I/O operations. These L-threads are paired with corresponding pool threads, which act as handles for associated OS-threads that perform the I/O operations. There are also a number of unused pool threads 150, which are not associated with L-threads.

When one of the active L-threads 130 encounters an I/O operation, the L-thread is paired with a pool thread from the unused pool threads 150. This pool thread acts as a handle for a native OS-thread within the underlying operating system 170, which performs the I/O operation. At this point, the L-thread is no longer one of the active threads, but instead becomes one of the I/O threads 140. After the I/O operation is complete, the L-thread returns to being one of the active L-threads 130 and the pool thread returns to being one of the unused pool threads 150.

Note that the term "I/O operation" as used in this specification and the appended claims refers to any type of operation with a long and/or unpredictable duration, which may cause a thread to block. Hence, the term "I/O operation" is not meant to be limited to only input of output operations. For example, an I/O operation can include a long computational operation, which is sent to a co-processor, and which may not return from the co-processor for a long period of time.

I/O Operation Parameters

Figure 2:
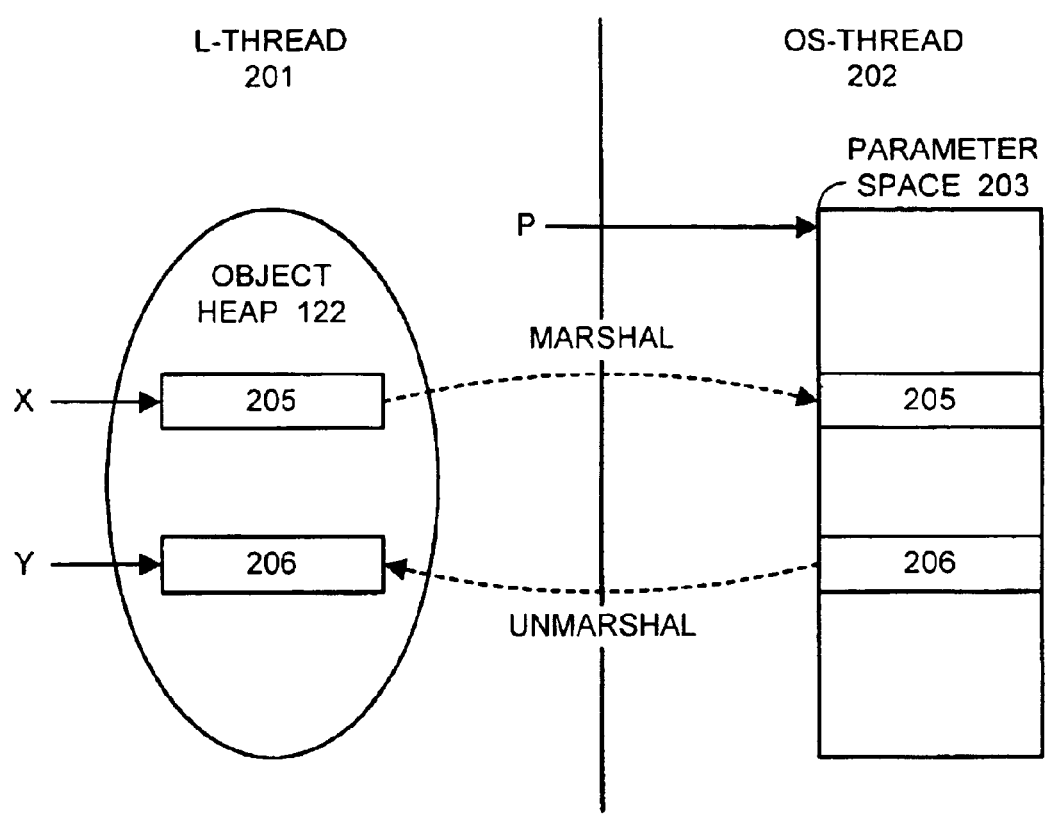
FIG. 2 illustrates how parameters are marshaled and unmarshalled in accordance with an embodiment of the present invention.

FIG. 2 illustrates how parameters are marshaled and unmarshalled in accordance with an embodiment of the present invention. When a language thread (L-thread) 201 encounters an I/O operation, L-thread 201 marshals one or more parameters for the I/O operation into parameter space 203, which is associated with a native OS-thread 202. For example, in FIG. 2, a value referenced by a pointer x in object heap 122 is marshaled into a field 205 in parameter space 203.

When the I/O operation is complete, one or more parameters from the I/O operation are unmarshalled from parameter space 203. For example, in FIG. 2, a value from a field 206 in parameter space 203 is unmarshalled into a location in object heap 122 referenced by a pointer y.

I/O Operation

Figure 3:
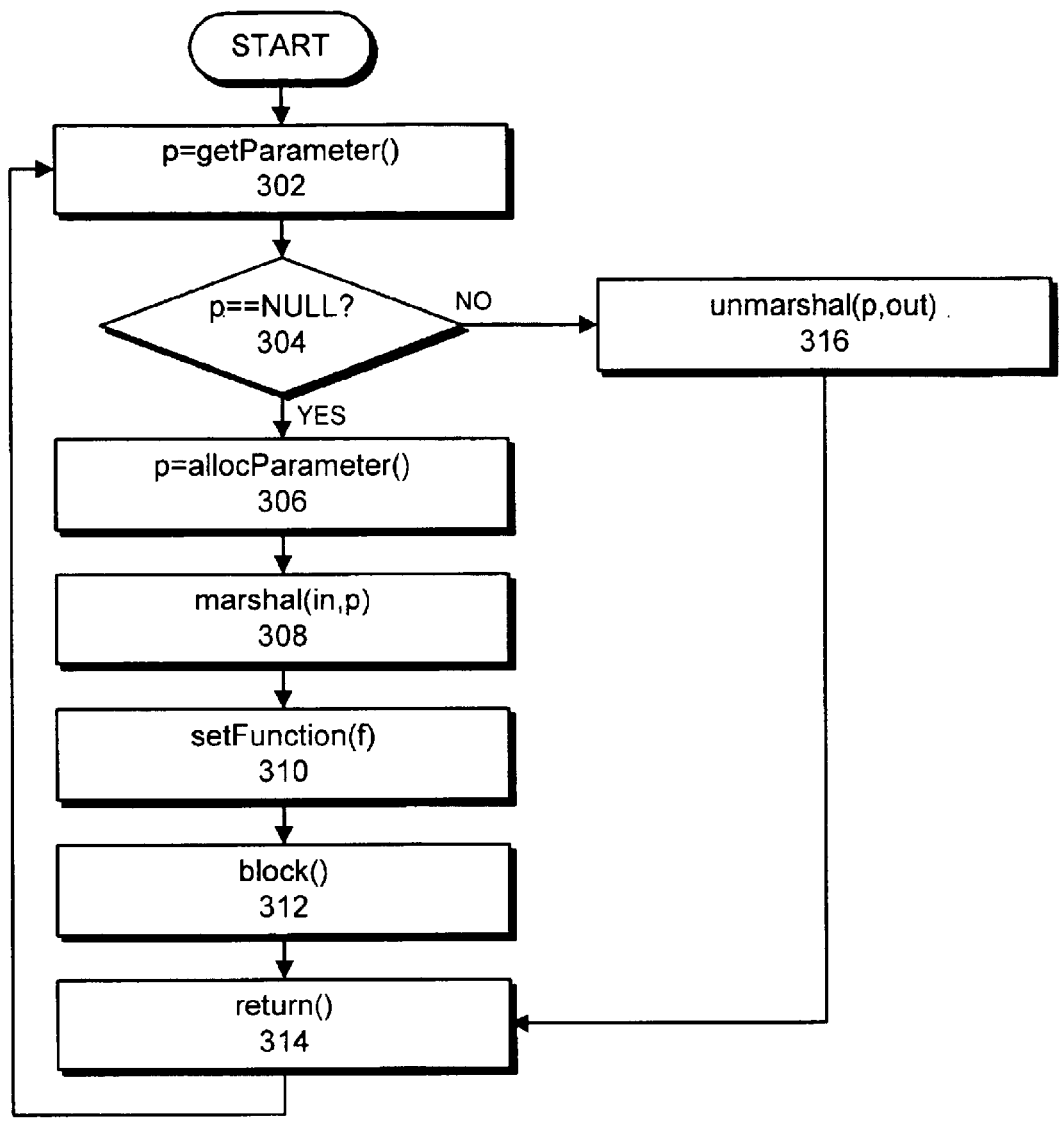
FIG. 3 presents a flow chart illustrating actions performed by a language thread during an I/O operation in accordance with an embodiment of the present invention.

FIG. 3 presents a flow chart illustrating actions performed by a language thread (L-thread) 201 during an I/O operation in accordance with an embodiment of the present invention. Upon encountering an I/O operation, L-thread 201 calls the function getParameter, which is implemented by OS-thread 202. The function getParameter returns a pointer to a parameter space 203 that contains parameters for the I/O operation (step 302).

L-thread 201 then determines if the returned parameter has a NULL value (step 304). If so, no parameter space has been allocated yet. In this case, L-thread 201 calls the function allocParameter, which is implemented by OS-thread 202. The function allocParameter returns a pointer to a parameter space 203 associated with OS-thread 202 (step 306).

In one embodiment of the present invention, parameter space 203 is a fixed-position memory block that is allocated for the purpose of marshalling data into and unmarshalling result data out of. This memory block can come from a number of sources. (1) It can be allocated from a global pool of memory located outside of the object heap. (2) It can be allocated in an unused end of the object heap. Or, (3) it can be allocated in stack space belonging to the associated native OS-thread.

Next, L-thread 201 calls the function marshal(in,p) to marshal input parameters from object heap 122 into parameter space 203 (step 308). Note that this marshalling function can involve a memory copy operation. L-thread 201 then calls the function setFunction(f), which prepares the I/O function f for execution by the associated OS-thread 202 (step 310). Note that the pointer p can be passed as a global parameter to OS-thread 202.

L-thread 201 then blocks (step 312) and returns (step 314). This causes L-thread 201 to go to sleep and also causes the associated OS-thread 202 to perform the I/O operation.

Note that the associated OS-thread 202 continually executes a loop, such as the loop below.

```
declare parameterSpace[];
loop {
    wait(execEvent);
    (*f)(p);
}
```

This loop causes OS-thread 202 to wait for an execEvent, such as L-thread 201 blocking in step 312. OS-thread 202 then executes the I/O function f with a pointers, which points to parameter space 203.

Note that before entering the loop above, OS-thread 202 declares a local variable parameterSpace with a preset amount of memory to implement parameter space 203. Note that this local variable stays in tact during: the marshalling process, the function execution, and the unmarshalling process. A pointer to this local variable can easily be tunneled to the L-thread 201 through a global variable since all setup can occur while there is only one L-thread running. In this way, no other concurrent L-threads can see the global variable.

When the I/O function f returns, L-thread 201 returns to step 302 and calls "getParameter" again. This time, in step 304, the pointer p is not NULL. Hence, L-thread 201 calls the function unmarshal(p,out) to unmarshal output parameters from parameter space 203 into object heap 122 (step 316). Note that this unmarshalling function can involve a memory copy operation. L-thread 201 then returns (step 314).

Instead of using OS-thread 202 to perform the marshalling and unmarshalling operations, the present invention requires L-thread 201 to perform these operations. Since the L-threads in virtual machine 116 are implemented as co-routines in a conceptually single-threaded environment, garbage collection operations on object heap 122 can be controlled relative to the L-threads. This means that L-thread 201 does not have to acquire a GC lock before accessing parameters in object heap 122.

Because the above-described technique does not allow OS-thread 202 to access object heap 122, OS-thread 202 does not have to worry about obtaining locks to protect against objects being moved within object heap 122 by the garbage collection process. Moreover, the present invention is more robust than prior systems because OS-threads do not access object heap 122.

Furthermore, since parameter space 203 is allocated from space associated with OS-thread 202, there is less fragmentation of memory within virtual machine 116.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performing independent asynchronous I/O operations within a platform-independent virtual machine, comprising:

encountering an I/O operation during execution of a language thread within the platform-independent virtual machine;

wherein the I/O operation includes parameters for the I/O operation; and in response to encountering the I/O operation, marshalling the parameters for the I/O operation into a parameter space located outside of an object heap for the platform-independent virtual machine, wherein the marshalling is performed by the language thread, and causing an operating system thread (OS-thread) associated with the language thread to perform the I/O operation, wherein the OS-thread accesses the parameters from the parameter space;

whereby the OS-thread does not access the object heap directly while performing the I/O operation wherein the platform-independent virtual machine operates in accordance with a hybrid thread model in which language threads that are not performing I/O operations execute as co-routines on a single OS-thread; and wherein language threads performing I/O operations are associated with dedicated OS-threads that perform the I/O operations.

2. The method of claim 1, wherein after the OS-thread finishes the I/O operation, the method further comprises:

unmarshalling parameters from the parameter space, wherein the unmarshalling is performed by the language thread; and returning from the I/O operation.

3. The method of claim 2, wherein marshalling the parameters involves marshalling the parameters from the object heap; and wherein unmarshalling the parameters involves unmarshalling the parameters into the object heap.

4. The method of claim 1, wherein the parameter space is associated with the OS-thread and is allocated from a global pool of memory located outside of the object heap.

5. The method of claim 1, wherein the parameter space is associated with the OS-thread and is allocated in an unused end of the object heap.

6. The method of claim 1, wherein the parameter space is allocated in stack space associated with the OS-thread.

7. A computer-readable storage medium storing instructions that when executed by a computer cause the computer to perform a method for performing independent asynchronous I/O operations within a platform-independent virtual machine, the method comprising:

encountering an I/O operation during execution of a language thread within the platform-independent virtual machine;

wherein the I/O operation includes parameters for the I/O operation; and in response to encountering the I/O operation, marshalling the parameters for the I/O operation into a parameter space located outside of an object heap for the platform-independent virtual machine, wherein the marshalling is performed by the language thread, and causing an operating system thread (OS-thread) associated with the language thread to perform the I/O operation, wherein the OS-thread accesses the parameters from the parameter space;

whereby the OS-thread does not access the object heap directly while performing the I/O operation wherein the platform-independent virtual machine operates in accordance with a hybrid thread model in which language threads that are not performing I/O operations execute as co-routines on a single OS-thread; and wherein language threads performing I/O operations are associated with dedicated OS-threads that perform the I/O operations.

8. The computer-readable storage medium of claim 7, wherein after the OS-thread finishes the I/O operation, the method further comprises:

unmarshalling parameters from the parameter space, wherein the unmarshalling is performed by the language thread; and returning from the I/O operation.

9. The computer-readable storage medium of claim 8, wherein marshalling the parameters involves marshalling the parameters from the object heap; and wherein unmarshalling the parameters involves unmarshalling the parameters into the object heap.

10. The computer-readable storage medium of claim 7, wherein the parameter space is associated with the OS-thread and is allocated from a global pool of memory located outside of the object heap.

11. The computer-readable storage medium of claim 7, wherein the parameter space is associated with the OS-thread and is allocated in an unused end of the object heap.

12. The computer-readable storage medium of claim 7, wherein the parameter space is allocated in stack space associated with the OS-thread.

13. An apparatus that performs independent asynchronous I/O operations within a platform-independent virtual machine, comprising:

an execution mechanism within the platform-independent virtual machine that is configured to execute a language thread;

wherein upon encountering an I/O operation, the execution mechanism is configured to, use the language thread to marshal parameters for the I/O operation into a parameter space located outside of an object heap for the platform-independent virtual machine, and to cause an operating system thread (OS-thread) associated with the language thread to perform the I/O operation, wherein the OS-thread accesses the parameters from the parameter space;

whereby the OS-thread does not access the object heap directly while performing the I/O operation wherein the platform-independent virtual machine operates in accordance with a hybrid thread model in which language threads that are not performing I/O operations execute as co-routines on a single OS-thread; and wherein language threads performing I/O operations are associated with dedicated OS-threads that perform the I/O operations.

14. The apparatus of claim 13, wherein after the OS-thread finishes the I/O operation, the execution mechanism is configured to:

unmarshal parameters from the parameter space, wherein the unmarshalling is performed by the language thread; and to return from the I/O operation.

15. The apparatus of claim 14, wherein the execution mechanism is configured to marshal the parameters from the object heap; and wherein the execution mechanism is configured to unmarshal the parameters into the object heap.

16. The apparatus of claim 13, wherein the parameter space is associated with the OS-thread and is allocated from a global pool of memory located outside of the object heap.

17. The apparatus of claim 13, wherein the parameter space is associated with the OS-thread and is allocated in an unused end of the object heap.

18. The apparatus of claim 13, wherein the parameter space is allocated in stack space associated with the OS-thread.

19. A means for performing independent asynchronous I/O operations within a platform-independent virtual machine, comprising:

an execution means for executing a language thread within the platform-independent virtual machine;

a receiving means for receiving an I/O operation during execution of the language thread;

a marshalling means for marshalling parameters for the I/O operation using the language thread into a parameter space located outside of an object heap for the platform-independent virtual machine; and a calling means that calls an operating system thread (OS-thread) associated with the language thread to perform the I/O operation, wherein the OS-thread accesses the parameters from the parameter space wherein the platform-independent virtual machine operates in accordance with a hybrid thread model in which language threads that are not performing I/O operations execute as co-routines on a single OS-thread; and wherein language threads performing I/O operations are associated with dedicated OS-threads that perform the I/O operations.

* * * * *